(12) United States Patent
Dahl

(10) Patent No.: US 9,084,412 B1
(45) Date of Patent: Jul. 21, 2015

(54) PET HARNESS

(71) Applicant: Elisabeth Allen Dahl, Cincinnati, OH (US)

(72) Inventor: Elisabeth Allen Dahl, Cincinnati, OH (US)

(*) Notice: Subject to any disclaimer, the term of this patent is extended or adjusted under 35 U.S.C. 154(b) by 0 days.

(21) Appl. No.: 14/549,513

(22) Filed: Nov. 20, 2014

Related U.S. Application Data

(60) Provisional application No. 61/906,488, filed on Nov. 20, 2013.

(51) Int. Cl.
*A01K 15/04* (2006.01)
*A01K 27/00* (2006.01)
*A01K 11/00* (2006.01)

(52) U.S. Cl.
CPC ............. *A01K 27/002* (2013.01); *A01K 15/026* (2013.01)

(58) Field of Classification Search
CPC .................................................. A01K 27/002
USPC .................. 119/769, 792, 821, 833, 815, 831
See application file for complete search history.

(56) References Cited

U.S. PATENT DOCUMENTS

| 5,038,717 A * | 8/1991 | Bent ............................... 119/815 |
| 5,551,380 A | 9/1996 | Hodgson |
| 6,564,754 B1 * | 5/2003 | Cohen ........................... 119/856 |
| 6,595,156 B1 * | 7/2003 | Curran .......................... 119/792 |
| 6,796,274 B1 * | 9/2004 | Moynihan, III ............... 119/831 |
| 7,107,939 B2 * | 9/2006 | Lady ............................. 119/792 |
| 7,357,099 B2 * | 4/2008 | Smith et al. ................... 119/771 |
| 7,930,997 B2 | 4/2011 | Ashby |
| 8,051,808 B2 * | 11/2011 | Mugford ....................... 119/792 |
| D664,309 S | 7/2012 | Mugford |
| 2009/0000570 A1 | 1/2009 | Ashby |
| 2011/0011353 A1 | 1/2011 | Stokes |
| 2011/0308479 A1 * | 12/2011 | Kuo .............................. 119/792 |

* cited by examiner

*Primary Examiner* — Kristen C Hayes
(74) *Attorney, Agent, or Firm* — KB Patents; Luca D'Ottone

(57) ABSTRACT

The inventive device object of the present application is an apparatus that attaches to the collar of a puppy or a dog and provides an accessible chew toy for the puppy to have in its mouth. The purpose of this product is to give the puppy or dog something to chew on while walking, to prevent them from chewing on the leash, and to help with their leash training. There is also an optional nose strap to be used in lieu of the bit to simply keep the dog's mouth closed. It is emphasized that this abstract is provided to comply with the rules requiring an abstract that will allow a searcher or other reader to quickly ascertain the subject matter of the technical disclosure.

5 Claims, 12 Drawing Sheets

PET HARNESS

CLAIM OF PRIORITY FROM RELATED APPLICATIONS

The present application claims priority from U.S. Provisional patent application Ser. No. 61/906,488 filed on Nov. 20, 2013 to Elisabeth Allen Dahl, directed to a BITZ, that is hereby incorporated by reference.

BACKGROUND OF THE INVENTION

1. Field of the Invention

The inventive device disclosed in the present application generally relates to pet harness and more specifically to an apparatus that attaches to the collar of a puppy or a dog and provides an accessible chew toy for the dog to have in its mouth. The inventor commonly refers to the Pet Harness of the present application as the "Bitz".

2. Brief Description of the Prior Art

Dog chew toy for harness is well known in the art. Various Patents and Published Patent applications are in fact directed to different kinds of pet harnesses and dog chew. While developing the invention of the instant application independently the Inventor researched extensively the public record as well as the current market for dog chews and the most relevant examples found in the search are mentioned in the Information Disclosure Statement (IDS) attached.

Despite all the efforts available to the public prior art patents describe structures that are either not truly convenient or else involve complicated, expensive, and overly difficult assembly and/or disassembly parts and procedures. Other devices have been advertised on various media but never patented or described into a printed publication.

SUMMARY OF THE INVENTION

The invention is an apparatus that attaches to the collar of a puppy or a dog and provides an accessible chew toy for the dog to have in its mouth. The purpose of this product is to give the puppy or dog something to chew on while walking, to prevent them from chewing on the leash, and to help with their leash training. There is also an optional nose strap to be used in lieu of the bit to simply keep the dog's mouth closed.

It is then the principal object of the present invention is to provide an easy way to eliminate the tendency or need for dogs to chew on their leashes when walking. It is a secondary objective of the present invention to provide puppies with a needed teething toy.

It is an additional objective of the present invention to provide a device that does not rust or deteriorate over time and that can be safely installed on a dog collar. It is a final objective of the present invention to provide for a device that is relatively inexpensive to build and set up, but can eventually be sold at a premium.

These and other objectives achieved by the device of the present invention will be apparent by the drawings, by their detailed description, and by the specification here from appended.

DESCRIPTION OF THE PREFERRED EMBODIMENT

Figure 1:
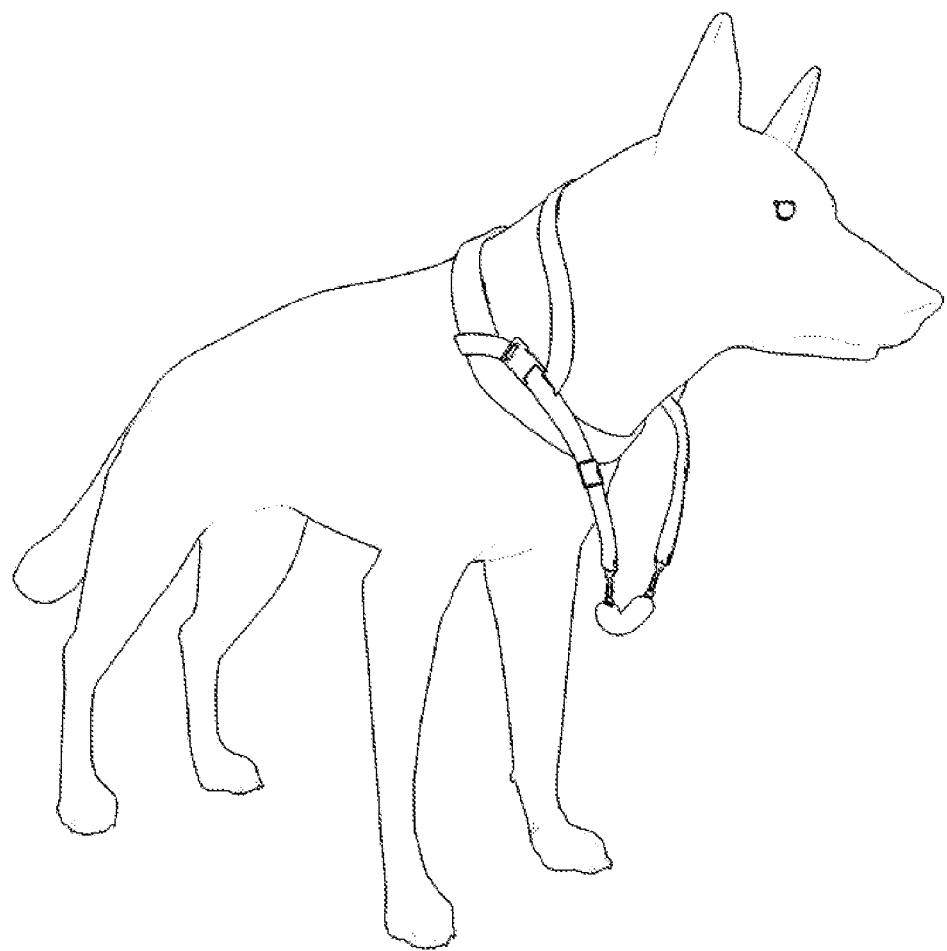
FIG. 1 is a first perspective view of one of the preferred embodiments of the pet harness "BITZ" worn by a dog with the chew part outside its mouth in accordance with the teachings of the present invention.
Figure 2:
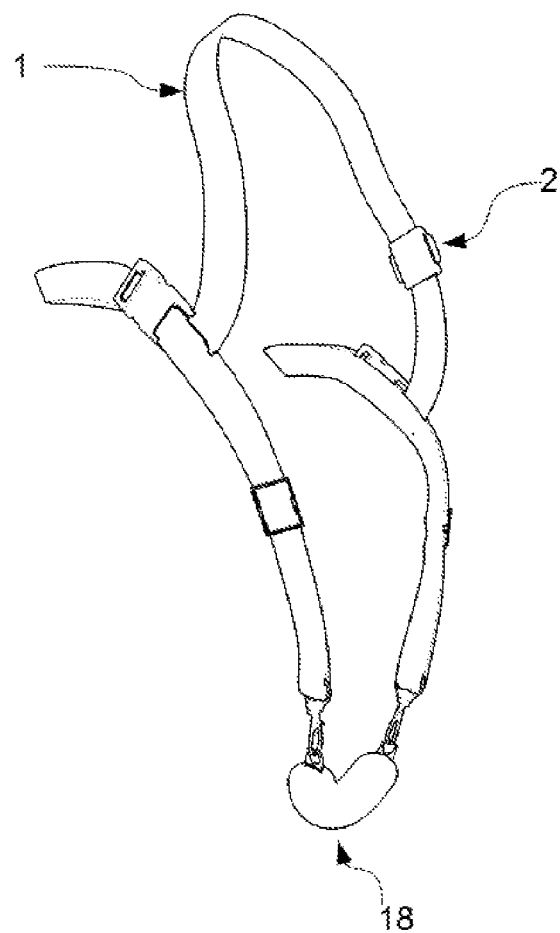
FIG. 2 is a front perspective view the preferred embodiments of the pet harness "BITZ" of FIG. 1.
Figure 3:
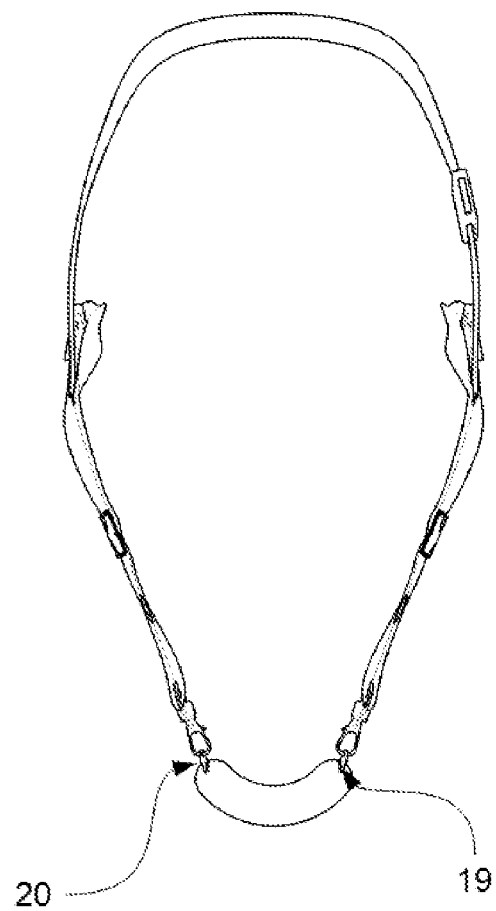
FIG. 3 is a front elevation view of the pet harness "BITZ" of FIG. 1.
Figure 4:
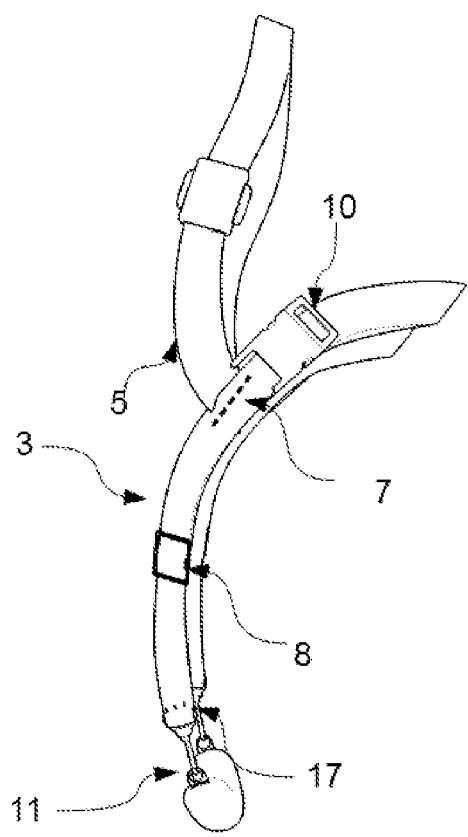
FIG. 4 is a left side elevation view of the pet harness "BITZ" of FIG. 1.
Figure 5:
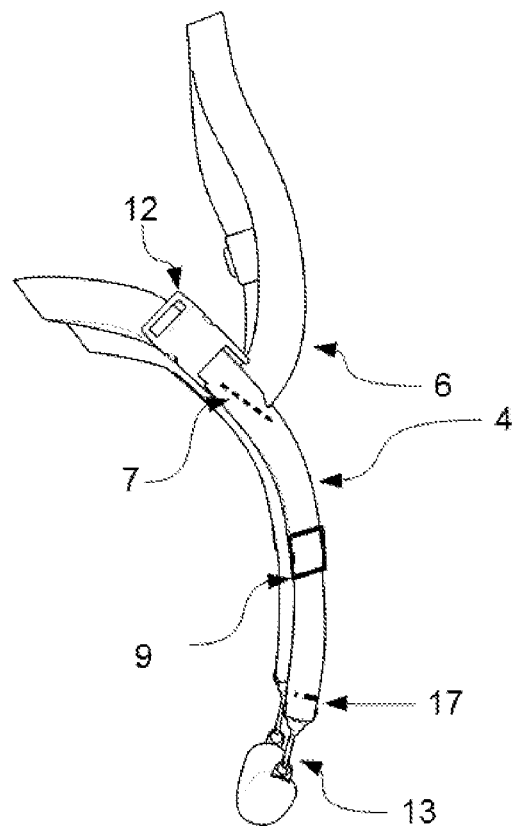
FIG. 5 is a right side elevation view of the pet harness "BITZ" of FIG. 1.
Figure 6:
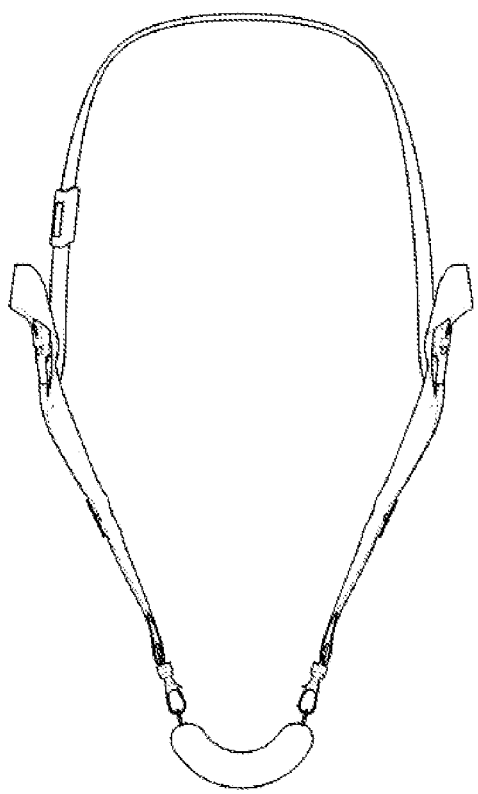
FIG. 6 is a back side elevation view of the pet harness "BITZ" of FIG. 1.
Figure 7:
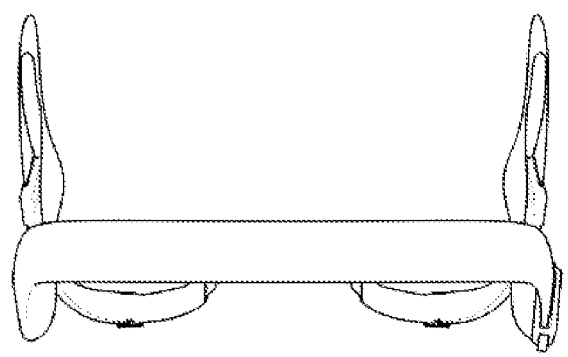
FIG. 7 is a top elevation view of the pet harness "BITZ" of FIG. 1.
Figure 8:
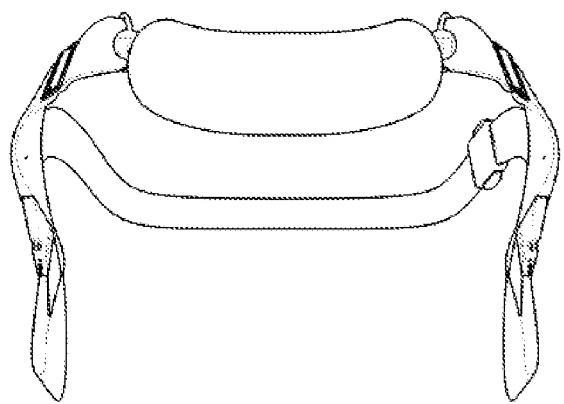
FIG. 8 is a bottom elevation view of the pet harness "BITZ" of FIG. 1.
Figure 9:
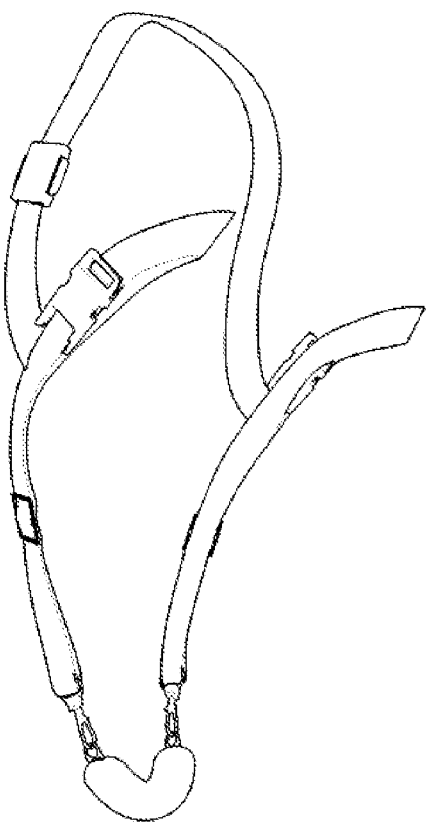
FIG. 9 is a back side perspective view of the pet harness "BITZ" of FIG. 1 and all it's features.
Figure 10:
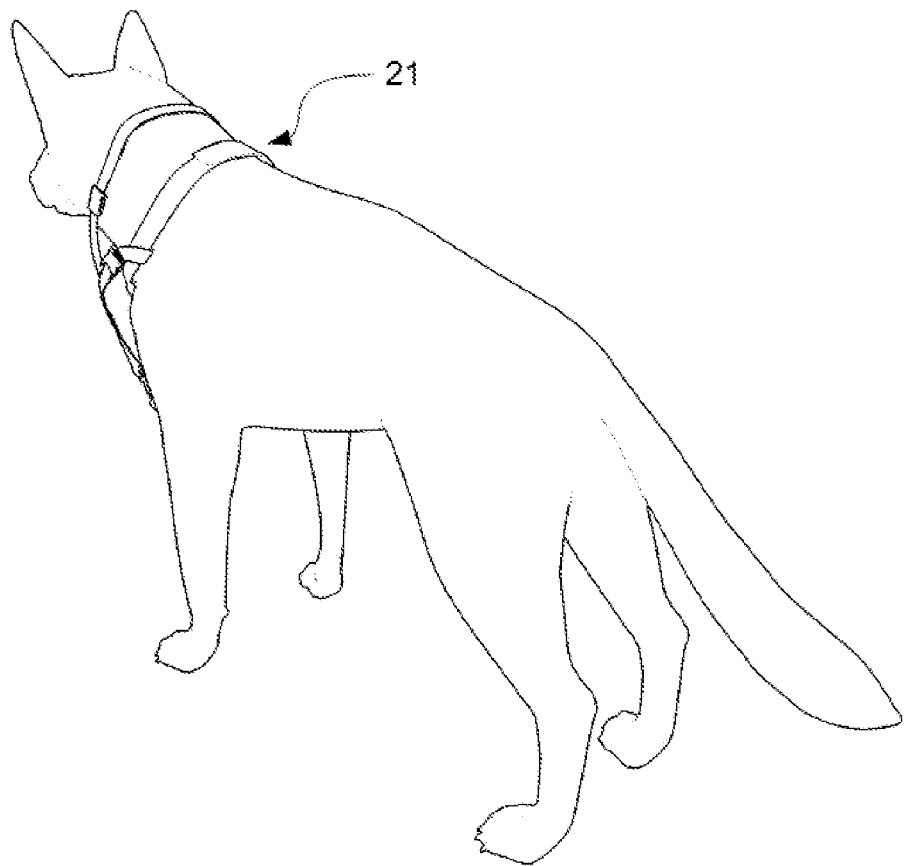
FIG. 10 is a back side perspective view of the pet harness "BITZ" of FIG. 1 worn by a dog.
Figure 11:
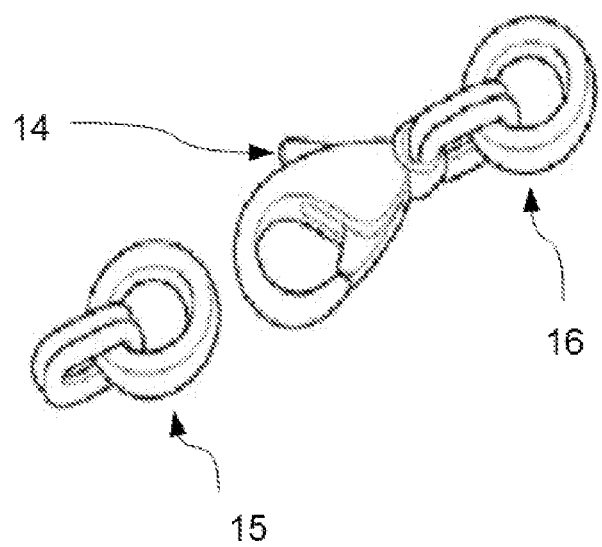
FIG. 11 is a pictorial representation of the lobster clasp or lobster hook (11, 13) under the teachings of the present application.
Figure 12:
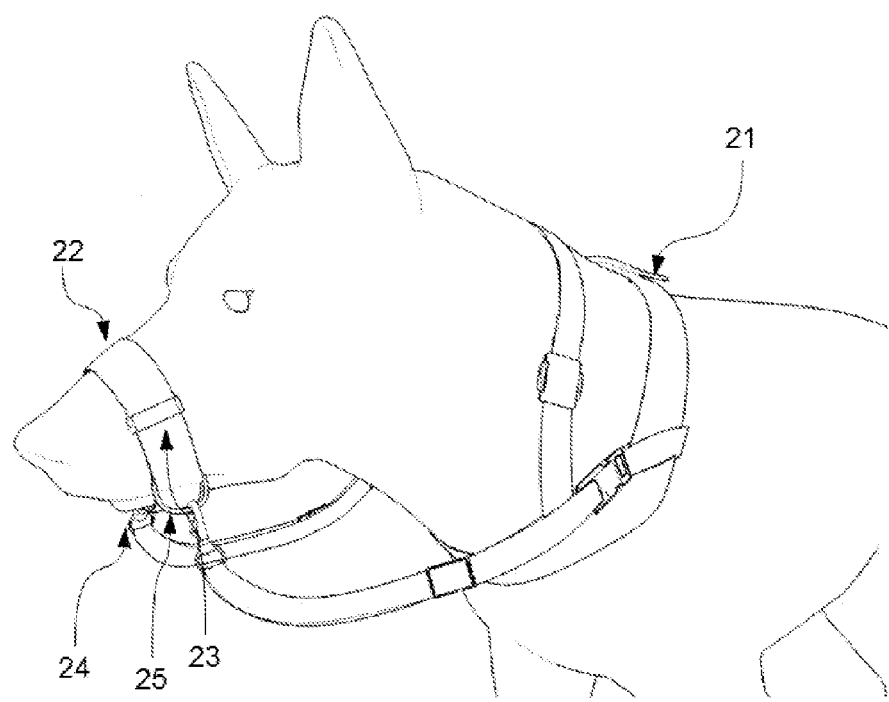
FIG. 12 is a pictorial representation of a separate preferred embodiment of the pet harness "BITZ" of the present application featuring the nose strap (22) having an adjustment piece (23) and metal loops (24; 25) designed to be attached to said lobster hooks.

The invention is an apparatus that attaches to the collar (21) of a puppy or a dog and provides an accessible chew toy for the dog to have in its mouth. The purpose of this pet harness is to give the puppy or dog something to chew on while walking, to prevent them from chewing on the leash, and to help with their leash training. There is also an optional nose strap to be used in lieu of the bit to simply keep the dog's mouth closed.

As it can be inferred from the drawings, the essential components of the "Bitz" of the present application include: a neck strap (1) with adjustment piece (2), where said neck strap (1) is has two opposite expremities a left extremity (5) and a right extremity (6) that are respectively sewn into two side straps, a left side strap (3) and a right side strap (4), by sawing thread (7). Each of said left side strap (3) and a right side strap (4) is adjustable by means of left adjustment piece (8) and right adjustment piece (9). Said left side strap (3) and said right side strap (4) have two opposite extremities ending respectively with a left collar buckle (10) at and left lobster hook (11) and with a right collar buckle (12) at and right lobster hook (13).

A lobster hook, also known as a lobster clasp, or bocklebee clasp, is a fastener that is held closed by a spring. The lobster clasp is opened or closed by holding a small lever (14), usually with a fingernail, long enough to apply, then it is attached (or removed from) a short link-chain or a ring-like structure (15) .Lobster clasps are often used for necklaces, bracelets, and keychains. Lobster clasps are named as such because of their "pinching" mechanism, and they are often shaped like a lobster's claw.

Said left lobster hook (11) and right lobster hook (13) have both a metal connector (16) sewn into their respective side straps (3, 4) by sawn thread (17). A custom nylon dog bone (18) with loops (19, 20) on each side (respectively left and right) to attach to said lobster hooks (11, 13). In a separate preferred embodiment of the pet harness of the present application further comprises a nose strap (22) having an adjustment piece (23) and metal loops (24; 25) designed to be attached to said lobster hooks.

Bitz is similar to a horse's bit as it places a chew toy in the dog's mouth. Because it attaches to the puppy's or the dog's collar as it walks, when the owner pulls on the collar, the toy will pull on the dog's mouth and help to control the dog without relying solely on pressure to their neck to direct the dog. Bitz loops around the dog's collar on both sides with easy-to-use buckles. It is further secured in place by an adjustable neck strap.

A chew toy, specially designed for Bitz, is attached, connecting the two ends of the side straps. These straps are also adjustable so the toy can fit comfortably in the dog's mouth. When walking the dog, the owner or trainer would place the toy in the dog's mouth, giving it something to chew on, to carry, and an easy way to help control the movement of the dog. A worn chew toy can be replaced or a different kind of toy added without having to purchase a new apparatus.

When needed to reduce barking and biting by dogs of all ages, a different accessory can replace the bit or chew toy. A loop of strap material can be clipped to where the chew toy is clipped on. This loop would slip around the dog's nose and effectively limit the dog's ability to bark or bite when walking.

The Bitz apparatus can be used with conventional dog collars as well as choke collars. This product will be available in different sizes (small, medium and large) for various sized puppies and older dogs as well and can be available in various colors.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet harness that attaches to the collar of a puppy or a dog to provides an accessible chew toy for the dog to have in its mouth comprising:
    a. a neck strap with
    b. an adjustment piece, where said neck strap ends with two opposite extremities: a left extremity, and a right extremity, respectively sewn into
    c. two side straps: a left side strap, and a right side strap, by
    d. a sewn thread; where each of said left side strap and a right side strap is made adjustable by
    e. a left adjustment piece, and
    f. a right adjustment piece; and where said left side strap and said right side strap have two opposite extremities ending respectively with:
    g. a left collar buckle, and
    h. a left lobster hook; and with a
    i. a right collar buckle, and
    l. a right lobster hook; where said left lobster hook and right lobster hook have
    m. a metal connector sewn into their respective side straps by
    n. a sewn thread.

2. The pet harness that attaches to the collar of a puppy or a dog to provides an accessible chew toy for the dog to have in its mouth of claim 1 further comprising: a custom nylon dog bone with a right and a left loops designed to be attached respectively to said left and right lobster hooks.

3. The pet harness that attaches to the collar of a puppy or a dog to provides an accessible chew toy for the dog to have in its mouth of claim 1 further comprising a nose strap with a left and right side straps each having an adjustment piece and metal loop designed to be attached to lobster hook.

4. The pet harness that attaches to the collar of a puppy or a dog to provides an accessible chew toy for the dog to have in its mouth of claim 1 where said lobster hook is opened or closed by holding a small lever.

5. The pet harness that attaches to the collar of a puppy or a dog to provides an accessible chew toy for the dog to have in its mouth of claim 1 where said lobster hook is designed to be attached to a ring.

* * * * *